Figure 1:
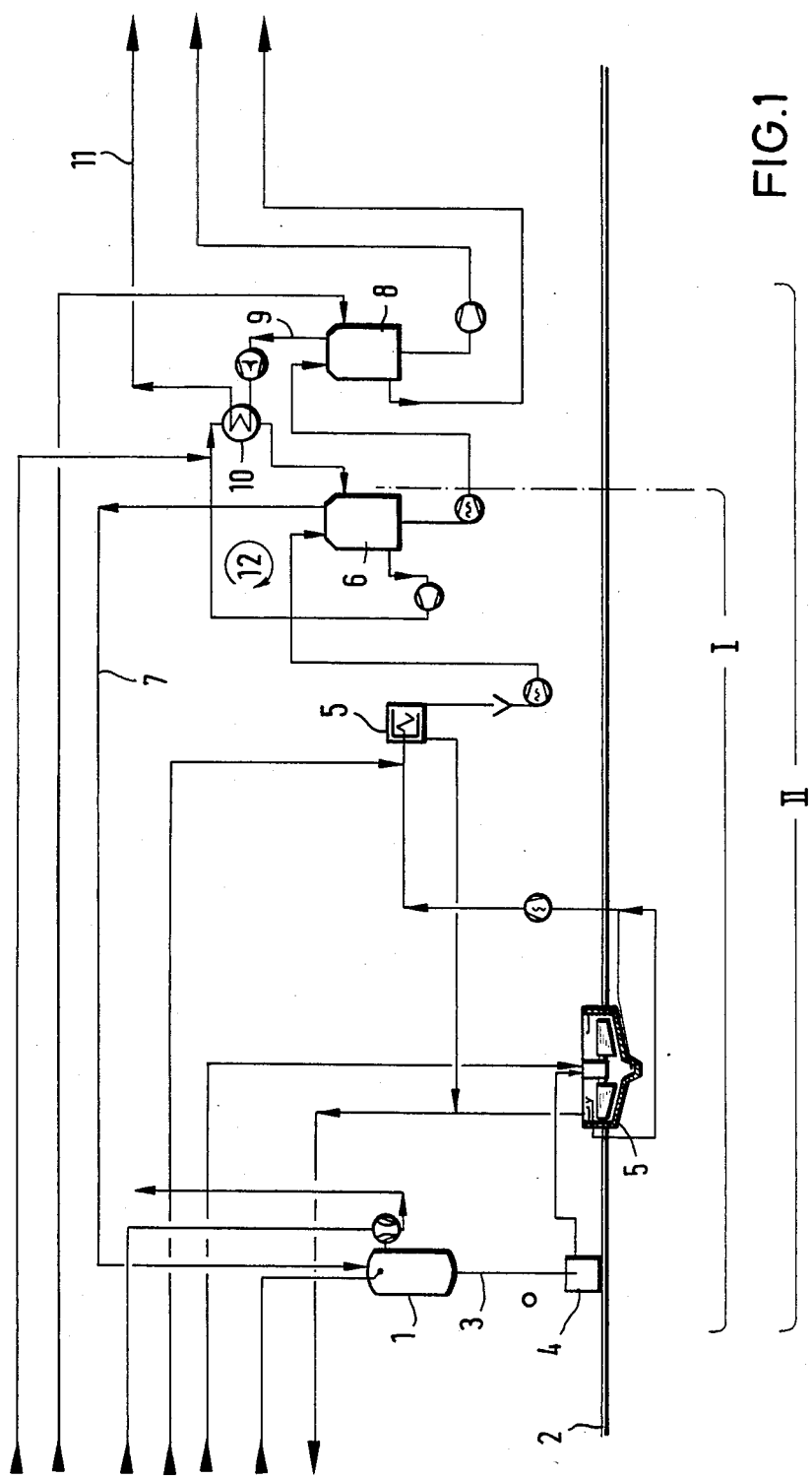

United States Patent [19]

Meurer et al.

[11] Patent Number: 4,742,623
[45] Date of Patent: May 10, 1988

[54] PROCESS AND EQUIPMENT FOR THE INDIRECT DRYING OF SLUDGE, ESPECIALLY FOR THE DRYING OF WASTEWATER SLUDGE

[75] Inventors: Peter Meurer, Herdecke-Ende; Heinrich Steuber; Jürgen Bässler, both of Dortmund; Winfried Liebig; Ludwig Mühlhaus, both of Iserlohn, all of Fed. Rep. of Germany

[73] Assignee: Uhde GmbH, Dortmund, Fed. Rep. of Germany

[21] Appl. No.: 775,424

[22] Filed: Sep. 12, 1985

[30] Foreign Application Priority Data

Sep. 25, 1984 [DE] Fed. Rep. of Germany ....... 3435094
Oct. 30, 1984 [DE] Fed. Rep. of Germany ....... 3439607

[51] Int. Cl.$^4$ .............................................. F26B 3/04
[52] U.S. Cl. ........................................... 34/15; 34/35; 34/73; 34/86; 34/92; 34/210; 34/216
[58] Field of Search ................ 34/15, 35, 86, 92, 73, 34/210, 216

[56] References Cited

U.S. PATENT DOCUMENTS

| | | | |
|---|---|---|---|
| 4,347,671 | 9/1982 | Dias et al. | 34/15 |
| 4,441,437 | 4/1984 | Moskau | 110/346 |
| 4,497,120 | 2/1985 | Laemmermann et al. | 34/92 |
| 4,523,388 | 6/1985 | Cuel | 34/86 |
| 4,566,204 | 1/1986 | Friesner et al. | 34/15 |

FOREIGN PATENT DOCUMENTS 2757783 6/1978 Fed. Rep. of Germany .
2083190 3/1982 United Kingdom ................ 34/92

Primary Examiner—Larry I. Schwartz
Attorney, Agent, or Firm—Toren, McGeady & Associates

[57] ABSTRACT

Referring to process and equipment for the indirect drying of sludge, especially for the drying of wastewater sludge, which may undergo previous mechanical dehydration and/or preheating, it is intended to provide a method that permits utilizing low-value energy for drying purposes while avoiding environmental nuisance. With reference to the process, the problem is solved by drying the sludge under vacuum which is produced by withdrawing the water vapor by means of an injection condenser, the equipment provided for solving the problem comprising a barometric condensor associated with a mechanical sludge dehydrator and at least one sludge drier for indirect drying with an hermetically closed sludge space, the gas dome of the sludge space being connected to the injection condenser through a line for withdrawal of the water vapor.

12 Claims, 2 Drawing Sheets

PROCESS AND EQUIPMENT FOR THE INDIRECT DRYING OF SLUDGE, ESPECIALLY FOR THE DRYING OF WASTEWATER SLUDGE

The invention relates to a process and to equipment for the indirect drying of sludge, especially for the drying of wastewater sludge, which may undergo previous mechanical dehydration and/or preheating.

A number of single-stage drying processes for wastewater sludge are known, which may be divided into two groups, i.e. processes for direct drying and processes for indirect drying.

The disadvantage inherent in direct drying is that the water vapour resulting from the drying process is subject to undergo mixing with a large volume of flue gas used for drying, which imposes considerable expenditure in terms of exhaust gas treatment and/or postcombustion. Referring to a postcombustion step, for example, an energetic advantage which is intended to be achieved by the drying process is lost. If provision is made for scrubbing the exhaust gas from the drying process, it has the disadvantage of involving the risk of odour nuisance.

Referring to processes for indirect drying, heating is done by means of steam or heat carrier fluids, for example heat carrier oil, the water vapour being withdrawn at ambient pressure for subsequent condensation which must be performed at a very high energy level.

Considering that in many sludge incineration facilities the flue gas is at temperature of 100° to 300° C. downstream of the steam boiler or on air preheater, further energy recovery would be uneconomical in the majority of cases because this energy would be available at a relatively low temperature level. This is because at normal flue gas pressure a substantial portion of the energy to be recovered at temperatures below 85° C. will not be available until condensation of the water vapour. This energy is frequently used for long-distance heating or for producing hot general-purpose water.

Proposals have also been made to utilize this energy with the aid of heat pumps. The use of heat pumps for this purpose is rather expensive, especially because of the high electric power demand.

The object of the invention is to provide a process as defined above for utilizing this energy at a low temperature level for drying purposes.

For processes as defined above the problem is solved according to the invention in that drying of the sludge is performed under vacuum, the vacuum being produced by withdrawing the water vapour with the aid of an injection condenser.

This mode of operation has substantial advantages. A marked advantage is that for drying under vacuum the drier—this may be a thin-film evaporator, for example—can be heated with waste steam. The generation of the vacuum by means of an injection condenser through withdrawal of the water vapour from the drier has the substantial advantage that the water vapour undergoes immediate condensation so that no environmental nuisance will occur. The small portion of non-condensable substances is withdrawn by means of a vacuum blower and sent to the downstream combustion.

An embodiment of the invention provides for setting the vacuum at less than 0.3 bar absolute.

If, for example, the water vapour in the injection condenser undergoes condensation at a mean temperature of 40° C., the sludge side of the drier will be at a pressure which will exceed the aforesaid pressure by not more than the pressure drop in the feed line between the two items of equipment. As a result, the sludge side of the drier will be at a boiling temperature of 45° to 50° C., for example, which is but slightly higher than the temperature in the injection condenser.

A further embodiment of the invention provides for the sludge space of the drier to be hermetically closed and for the water vapour to be withdrawn by and condensed in a barometric injection condenser to which sludge, wastewater or cooling water are admitted. The injection condenser may be installed at 10 m above floor level to produce the necessary vacuum by being fed with sludge or with wastewater. Withdrawal by means of a vacuum blower extends only to the non-condensable fluids to prevent a gradual pressure rise.

A comparative evaluation shows that conventional heating of the drier with steam at, for example, 7 bar and 164° C. will yield a temperature difference of 64° C. at ambient pressure on the sludge side while a temperature difference of 65° C. will be available at a boiling temperature of 45° C. in the condenser when the drier is heated with steam at 1.5 bar and 110° C. Consequently, the heat-exchange areas may practically have the same size, the invention offering the advantage that inexpensive waste steam can be used while prior art requires the use of more-valuable energy.

A further embodiment of the invention provides for drying to be performed in two stages, the sludge side of the first stage being operated under vacuum as defined in the main claim, while the sludge side of the second stage is operated at normal pressure or positive pressure. Independent protection is claimed for this version because sludge drying processes according to the prior art are of the single-stage type throughout. It has been evidenced that the two-stage process as defined by the claims of this invention offers further substantial advantages.

It can be especially advantageous to heat the first stage with the aid of a hat carrier fluid, for example a heat carrier oil or steam, this heat carrier fluid being heated in a heat exchanger by the water vapour from the second stage.

The application of a heat carrier fluid has the advantage that the drier may contain hardly accessible heating areas because the heating areas are not subject to contamination by the condensation of water vapour from the second stage, which would necessarily result in reduced heat-exchange efficiency.

A particularly useful embodiment of the invention provides for using a fluoridated chlorinated hydrocarbon, for example trifluorotrichloroethane ($C_2C_3C_3$) as heat carrier fluid for indirect drying.

This heat carrier fluid is especially suitable because its vapour pressure is 1.285 bar at 55° C., that means that vapour pressure is slightly above the ambient pressure.

A further embodiment of the invention provides for vaporizing the heat carrier fluid by means of the flue gas obtained from sludge incineration downstream of the steam boilers or an air preheater. The advantages inherent in this method were outlined before.

It may be expedient to admit the flue gas to a heat exchanger, preferably a finned-tube heat exchanger, for lowering its temperature to about 60° C. by heat exchange with the heat carrier fluid, the invention providing for vaporization or heating of the heat carrier fluid in the heat exchanger at 50° to 80° C., preferably at 55° to 60° C.

These figures are especially expedient with reference to energy conditions prevailing in sludge incineration facilities. In order to achieve satisfactory sludge drying rates, the invention also provides for using the vapour of the heat carrier fluid from the heat exchanger to heat a sludge drier which is at a vacuum of approximately 0.04 to 0.3 bar absolute.

At such a low vacuum, the boiling temperature of the sludge water is about 28° C. to 45° C. Consequently, the temperature gradient available for drying is approximately 20° to 50° C. The vacuum is maintained by condensing the water vapour in an injection condenser to which, for example, purified wastewater is admitted. Inert gases can be withdrawn with the aid of a vacuum pump.

Referring to the process for which protection is sought it is advantageous that the trifluorotrichloroethane admitted to the drier condenses at approximately the same temperature at which vaporization takes place. The pressure drops in the system are negligeable. Therefore, no compressor is needed as would be required when a heat pump is used.

If other operating conditions are selected, for example a higher boiling pressure of the heat carrier fluid, the latter may be superheated and subsequently expanded in a turbine for generating electric power before it is applied for heating the drier.

It should be added that the invention is not limited to the temperature ranges indicated above. The limits may vary depending on prevailing operating conditions, but the ranges cited above are particularly indicated to achieve utilization of energies which are presently dissipated to the environment, for the drying of sludge, for example. The heat may naturally also be utilized for other drying processes.

The invention also provides for equipment permitting performance of the process or processes according to the invention. Referring to a single-stage process, this equipment comprises a barometric injection condenser with a downstream mechanical sludge dehydrator and at least one drier for indirect sludge drying, this drier being provided with an hermetically closed sludge space, the gas dome of the sludge space being connected to the injection condenser through a line for the withdrawal of water vapour.

If a two-stage process is preferred, the equipment provided for according to the invention comprises a second drier for indirect sludge drying arranged downstream of the first sludge drier, the heating of the heat carrier fluid of the first sludge drier being performed in a heat exchanger heated by the water vapour from the second sludge drier.

The invention is described below by way of example with reference to the attached drawing. The drawing shows in FIG. 1 a flowsheet of a plant for performing the process according to the invention, FIG. 2 a modified flowsheet of the plant.

the plant depicted by way of example in FIG. 1 is suitable for performing a single-stage drying process (marked by bracket I) and for performing a two-stage drying process (marked by bracket II).

An injection condenser 1 is installed at barometric level, i.e. at 10 m above floor level 2. It is fed with sludge through the line marked accordingly. The discharge pipe 3 from injection condenser 1 terminates in a dip pot 4 placed on floor 2. The wastewater sludge leaving dip pot 4 is sent to a centrifuge 5 for preliminary dehydration and subsequently passed by known means to a first indirectly heated sludge drier 6.

As far as the sludge space is concerned, the sludge drier 6 is hermetically closed.

A line 7 is provided for the withdrawal of the water vapour from the sludge drier by vacuum and subsequent admission to injection condenser 1 where the vapour undergoes condensation.

Referring to a two-stage process, the sludge predried in sludge drier 6 is sent to another sludge drier 8 for final drying before extraced as dried sludge. The water vapour leaves the gas dome of the second sludge drier 8 through a line 9, passes to heat exchanger 10 and leaves the plant as condensate through line 11.

Heat exchanger 10 heats a recycled heat carrier fluid. This cycle is marked by arrow 12 in the Figures. This heat carrier fluid heats indirectly the sludge drier 6 while sludge drier 8 is heated indirectly by means of steam, for example.

Figure 2:
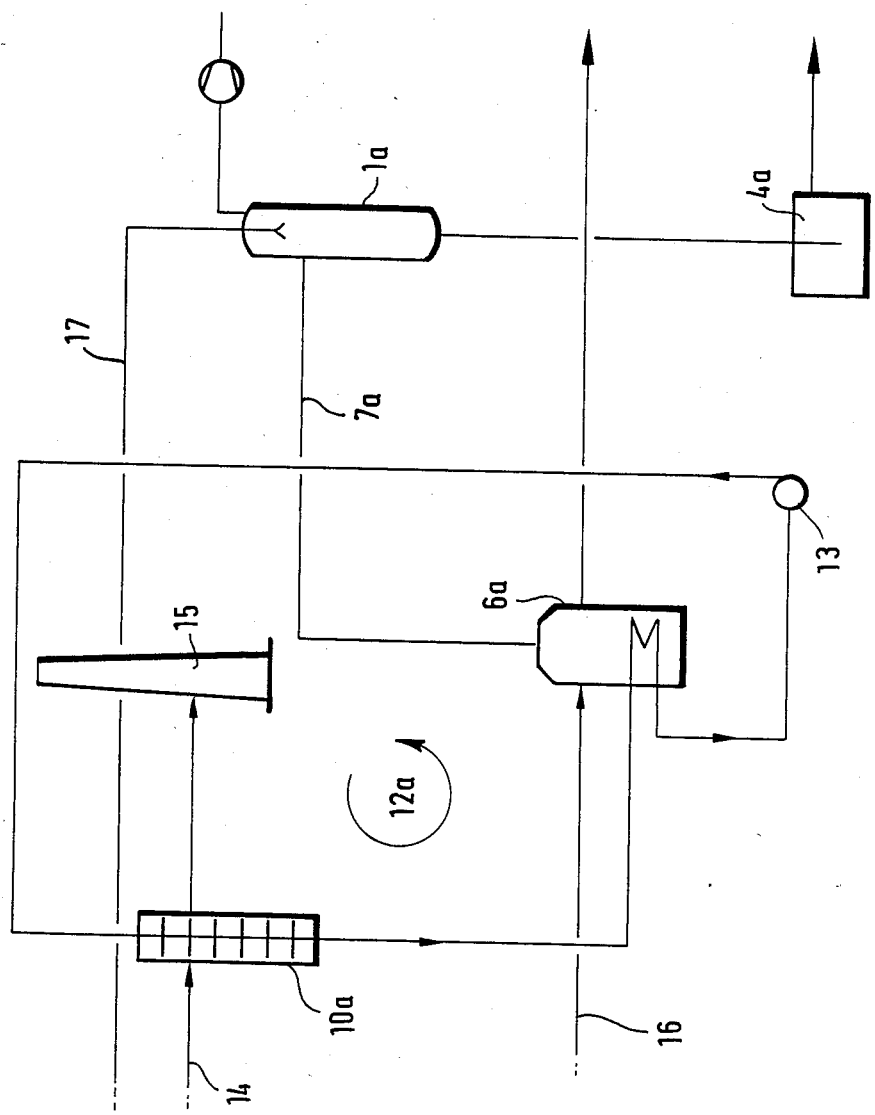

Referring to the plant flowsheet depicted in FIG. 2 all components comparable to those of FIG. 1 are marked with the same reference symbol supplemented by "a", that means, for example, that the arrow indicating the recycle flow of the heat carrier fluid in the center of the Figure is marked 12a.

The recycle flow path 12a of the heat carrier fluid comprises condensation of the fluid in sludge drier 6a, the condensate being sent by pump 13 to heat exchanger 10a where it is vaporized and subsequently admitted as vapour phase to sludge drier 6a.

The flue gas required for vaporization in heat exchanger 10a comes in through line 14 and leaves the plant via a stack 15 that is shown schematically. The sludge enters the drier 6a through line 16 and leaves it as dry sludge. Referring to the configuration of the plant according to FIG. 1, the system also comprises feed line 17 for wastewater, sludge or cooling water, which leads to an injection condenser 1a that is capable of producing the vacuum in drier 6a. An example of the process may be described for better understanding.

Wastewater sludges with the usual solids content of 1 to 10% DS (dry substance) are passed through an injection condenser and dehydrated with the aid of centrifuges, belt screens, etc. to obtain a solids content of 10% to 35% dry substance.

The mechanically dehydrated sludge is sent to a drier, for example a thin-film evaporator or disk-type drier, heated by means of steam or water vapour.

The water vapour obtained in this drier is condensed in an injection condenser at temperatures ranging from 10° to max. 80° C., preferably from 10° to 40° C. As a result, the sludge side of the drier is at a pressure which exceeds the vapour pressure of water at the maximum temperature in the injection condenser by not more than the pressure drop in the system.

The boiling temperature corresponding to the pressure prevailing in the drier is approximately 25° to 45° C. The drier is heated with steam at approximately ambient pressure (0.8–2 bar) or with heat carrier oil. The resulting temperature difference is at least 40° C. which is sufficient for a satisfactory evaporation rate.

The steam for heating the first stage is produced in a steam boiler which is heated by condensation of the water vapour from the second stage in a special heat exchanger.

If heat carrier oil is used instead of steam for heating the drier, this oil is heated to approximately 90°–120° C. by means of water vapour from the second stage.

The water vapour from the second stage can be sent to a vapour compressor for being compressed so that the temperature difference in the first stage is approximately the same as in the second stage (if both stages are heated with steam).

The predried sludge from the first stage is dried in the second stage by means of steam at 4 to 15 bar, preferably 6 to 12 bar, or by means of heat carrier oil at 120° to 320° C., preferably 180° to 300° C.

The method permits reducing the demand for imported energy for sludge drying to about 60%.

The embodiments of the invention described before by way of example permit, of course, a plurality of modifications without deviating from the basic idea of the disclosure. In particular, the equipment components depicted and described do not impose any restriction upon the invention but may be replaced by components of similar design or performing in a similar way, pressures and temperatures are cited only by way of example, etc.

We claim:

1. A process for the indirect drying of sludge, comprising carrying out the drying in at least three successive concentration stages, wherein the first and third stages are carried out under a vacuum and the second stage is carried out under normal pressure, the first stage being a barometric condenser, the second stage being a mechanical drier, and the third stage being an indirectly heated sludge drier, withdrawing water vapor generated in the sludge drier from the sludge drier by means of the vacuum and conducting the water vapor to the barometric condenser through a return pipeline connecting the sludge drier with the barometric condenser.

2. The process according to claim 1 wherein the vacuum is set at a level below 0.3 bar absolute.

3. The process according to claim 1 or 2 wherein the sludge space of the drier is hermetically closed.

4. The process according to claim 1 wherein the first stage is heated by means of a heat carrier fluid, this heat carrier fluid being heated in a heat exchanger by means of the water vapour from the second stage.

5. The process according to claim 1 wherein fluoridated chlorinated hydrocarbons are used as heat carrier fluid.

6. The process according to claim 5 wherein the heat carrier fluid is vaporized by means of flue gas obtained from sludge incineration downstream of the steam boiler.

7. The process according to claim 4 wherein the flue gas temperature is lowered to a level above/equal 60° C. by heat exchange with the heat carrier fluid in a heat exchanger.

8. The process of claim 4 wherein the heat carrier fluid is vaporized in the heat exchanger at 50° to 80° C., preferably at 55° to 60° C.

9. The process according to claim 4 wherein the vapour of the heat carrier fluid from the heat exchanger is used for heating the sludge drier which operates under a vacuum of approximately 0.04 to 0.30 bar absolute.

10. The process of claim 1 or 2 wherein the heat carrier fluid is recycled.

11. An equipment for the indirect drying of sludge, comprising at least three successive stages, the first stage being a barometric condenser, the second stage being a mechanical drier, and the third stage being an indirectly heated sludge drier, the first and third stages being under a vacuum and the second stage under normal pressure, and a pipeline connecting the sludge drier with the barometric condenser for withdrawing water vapor generated in the sludge drier from the sludge drier by the vacuum and conducting the water vapor to the barometric condenser.

12. The equipment of claim 11 comprising a second drier for indirect sludge drying arranged downstrem of the first drier, a heat exchanger heated by means of water vapor generated in the second sludge drier being provided for heating a heat carrier fluid utilized for heating the barometric condenser.

* * * * *